United States Patent [19]

Shimizu

[11] 4,003,268
[45] Jan. 18, 1977

[54] FILM WINDING DEVICE FOR PHOTOGRAPHIC CAMERAS

[75] Inventor: Terushige Shimizu, Kawasaki, Japan

[73] Assignee: Nippon Kogaku K.K., Tokyo, Japan

[22] Filed: May 23, 1975

[21] Appl. No.: 580,522

Related U.S. Application Data

[63] Continuation of Ser. No. 480,482, June 18, 1974, abandoned.

[52] U.S. Cl. .................................. 74/126; 74/88; 242/71.3; 242/71.4; 354/213
[51] Int. Cl.² ................. F16H 27/02; F16H 29/02; G03B 1/24; G03B 1/10
[58] Field of Search ......... 74/88, 421 R, 126, 133; 354/213; 242/71.3, 71.4

[56] References Cited

UNITED STATES PATENTS

| | | | |
|---|---|---|---|
| 2,879,704 | 3/1959 | Winkler et al. | 354/213 |
| 3,007,382 | 11/1961 | Bok | 354/213 X |
| 3,832,729 | 8/1974 | Tenne | 354/213 |

Primary Examiner—Leonard H. Gerin
Attorney, Agent, or Firm—Shapiro and Shapiro

[57] ABSTRACT

An improved film winding device for photographic cameras, having a sprocket, a sprocket rotation limiting member and an engaging member, both of which move in unity with the sprocket, a stopper member which is interconnected with the film winding operation to be engaged with the sprocket rotation limiting member at the completion of one film frame winding to stop further rotation of the sprocket, and a driving member which is also interconnected with the film winding operation to be engaged with the engaging member to drive the engaging member for the rotation of the sprocket, the engaging member and the driving member being disposed at a predetermined space interval therebetween prior to commencement of the film winding operation, and the shifting quantity of the driving member being made greater than the shifting quantity of the engaging part.

11 Claims, 14 Drawing Figures

FILM WINDING DEVICE FOR PHOTOGRAPHIC CAMERAS

This application is a continuation of application Ser. No. 480,482 filed June 18, 1974, now abandoned.

BACKGROUND OF THE INVENTION

1. Field of the Invention

This invention relates to an improved film winding device for photographic cameras.

2. Description of the Prior Art

In the conventional type of cameras which perform film winding operations by means of a film winding lever, there have been various problems such that, when the gears constituting the gear mechanism to transmit rotational force of the film winding lever to a sprocket are not in high precision, the backlash among the gears differ from camera to camera, which makes it difficult to transmit the rotation with high accuracy. When such accurate and precise winding operation is to be performed without the backlash among the gears, high precision machining and assembling of the gears are necessary. Also, when the film winding lever is subjected to an abrupt operating condition, rotation of the sprocket becomes excessive due to the inertia in each gear with the result that intervals among the adjacent film frames become irregular.

SUMMARY OF THE INVENTION

In view of the above-described problems with the conventional film winding device for photographic cameras, it is the primary object of the present invention to provide an improved film winding device which is capable of regularly and constantly winding a predetermined length of the photographic film without being influenced by the rotation of the film winding lever and the sprocket, even if there is backlash among the gears for the winding lever and the sprocket, as well as errors in the distances between the centers of the gears. Moreover, without being influenced on the number of revolution of the sprocket, even when the film winding lever is subjected to an abrupt winding operation.

According to the present invention, there is provided an improved film winding device for photographic cameras, which comprises in combination: a film winding shaft; a rotary driving member having a gear and an engaging part thereon; a fixed gear to transmit rotational force of the film winding shaft to the rotary driving member; and a sprocket having an engaging member which is engaged with the engaging part of the driving member to receive the rotational force of the rotary driving member, the engaging part of the driving member being provided with a rotational angle until it becomes engaged with the engaging member of the sprocket, in accordance with the following equations:

$$A = A' \text{ L const.} = (S \text{ const.} + \theta + A) \times \text{l/G const. D}$$
$$= S \text{ const.} + A'$$

where L is a definite number of revolutions of the film winding shaft; S is a definite number of revolutions required of the sprocket; $\theta$ is a reduced number of revolutions of the sprocket due to the backlash among the plurality of gears assembled between the film winding shaft and the driving member; A is a reduced number of revolutions of the sprocket due to the distance between the engaging part of the driving member and the engaging part of the sprocket; l/G is a gear ratio of the driving member to the film winding shaft; D is a number of revolutions of the driving member; and A' is a number of revolutions of the driving member until the driving member becomes engaged with the engaging part of the sprocket.

The foregoing object of the present invention, and the construction and functions of the improved mechanism which have been realized thereby will become more apparent and understandable from the following detailed description when read in conjunction with the accompanying drawing.

BRIEF DESCRIPTION OF THE DRAWINGS

FIG. 6 indicates a state wherein the film is being wound-up; and FIG. 7 indicates a state when the film winding operation is completed;

DESCRIPTION OF THE PREFERRED EMBODIMENTS

The present invention will be explained in the following in reference to a preferred embodiment of a photographic camera of a type in which a series of operations of film winding, shutter releasing, and shutter charging are performed by reciprocating motions of a single lever.

Note should be taken that FIGS. 3 to 14 of the accompanying drawing are simplified to the extent that unnecessary parts for the purpose of explanation of the relevant mechanism are omitted to avoid any complication of the drawing.

Figure 1:
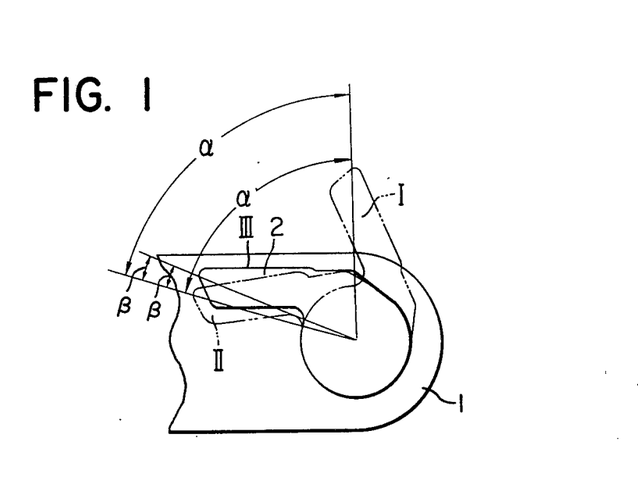
FIG. 1 is a diagram explaining the functions of the film winding lever according to an embodiment of the present invention.

Referring first to FIG. 1 for the function of the film winding lever according to the present invention, it is assumed that the shutter is in a charged state when the film winding lever 2 provided at one part of a camera body 1 is situated at a position I. This winding lever 2 is caused to rotate in the counterclockwise direction from the position I through an angle $\alpha$ to reach a position II, during which one film frame is wound. Thereafter, the film winding lever 2 rotates in the clockwise direction by an angle $\beta$ and stops at a position III. Again, this film winding lever 2 rotates in the counterclockwise direction by the angle $\beta$ from the position III and, in the course of its reaching the position II, the shutter is released, after which, while the lever 2 rotates in the clockwise direction from the position II through the angle $\alpha$ to arrive at the position I, the shutter is charged.

Based on the preceding explanation of the principle of the film winding, the shutter releasing, and the shutter charging operations, actual construction of the operating mechanism will be described hereinbelow with reference to FIGS. 2 to 14.

Figure 2:
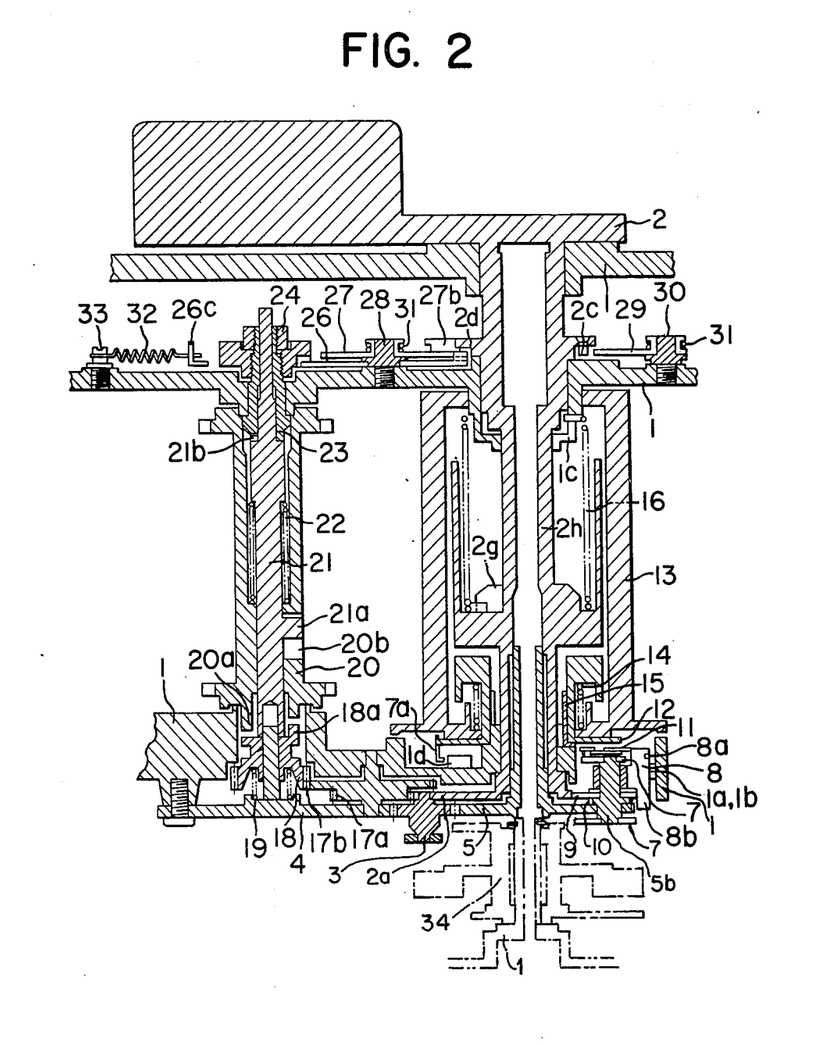
FIG. 2 is a longitudinal cross-section showing the main part of the embodiment of the film winding device according to the present invention.
Figure 3:
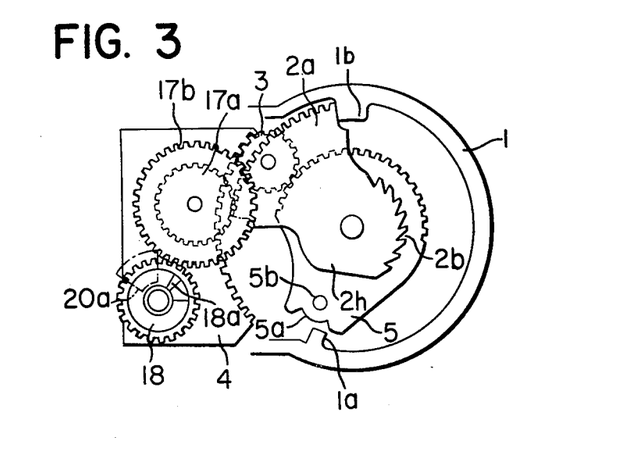
FIG. 3 is a plan view showing a driving mechanism for a sprocket according to the embodiment of the present invention.

Referring to FIG. 2 which shows a longitudinal cross-section of the film winding mechanism according to the present invention, the film winding lever 2 and a film winding shaft 2h integrally formed with the film winding lever 2 are rotatably supported on the camera body 1. This winding shaft 2h, as shown most clearly in FIG. 3, is provided at the bottom part thereof with a sector gear 2a and ratchet teeth 2b integrally formed with the film winding shaft 2h. On the top part of the film winding lever 2, on the other hand, there are provided an eccentric pin 2c, ratchet teeth 2d, a notched part 2e, and a shallow recess 2f, all being formed integrally with the film winding shaft 2h on the peripheral part thereof, as is most clearly shown in FIG. 10. Further, at the center part of the film winding shaft 2h, there is integrally formed a hook 2g for a spring.

As is clearly shown in FIGS. 2 and 3, a planet gear 3 which is formed on one part of the sector gear 2a and is rotatable with the film winding shaft 2h is engaged with an internal gear 4 fixed on the camera body 1 and a sun gear 5 rotatably supported in the film winding shaft 2h. This sun gear 5 is provided in one part thereof with a sector type notch 5a and a fixed shaft or pin 5b in the vicinity of the notch 5a.

Figure 4:
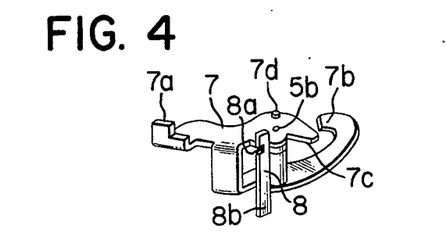
FIG. 4 is a perspective view of a spool actuating member according to the embodiment of the present invention.

As shown in FIG. 4 a spool actuating lever 7 is rotatably supported by a shaft 5b fixed on the sun gear 5, and possesses a ratchet pawl 7a for the spool, a releasing pawl 7b, a release control part 7c, and a fixed pin 7d. A change-over lever 8 is rotatably supported on the fixed pin 5b of the sun gear 5. One end part of a change-over lever 8 is provided with a small groove 8a for hooking a spring, and the other end thereof is engaged with the sector notch 5a of the sun (FIGS. 5 and 7) to undergo restriction in its rotation.

Figure 5:
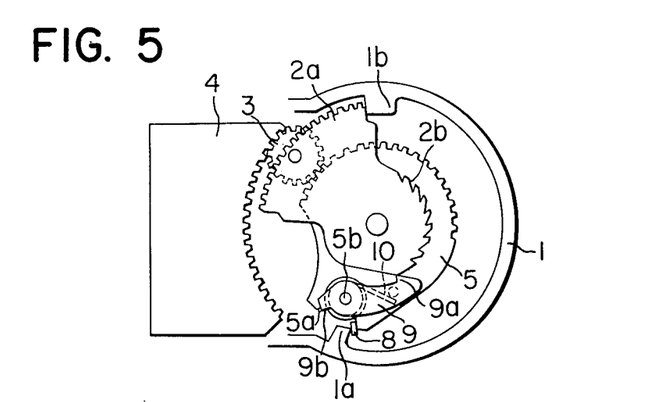
FIGS. 5, 6 and 7 are respectively plan views showing operating conditions of the anti-reversing or the reverse rotation prevention mechanism in the film winding device according to the embodiment of the present invention, in which FIG. 5 indicates a state of the anti-reversing mechanism immediately before commencement of the film winding.
Figure 6:
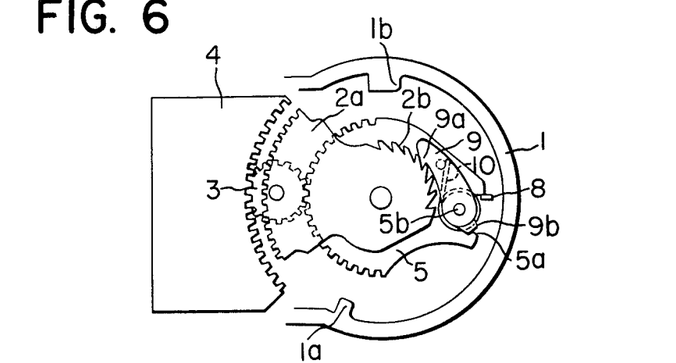
Figure 7:
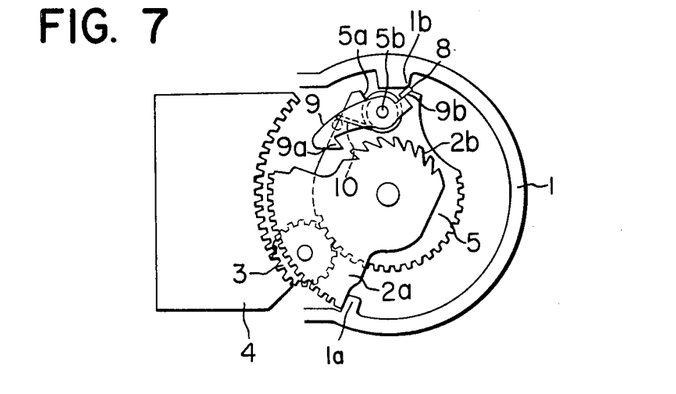
Figure 8:
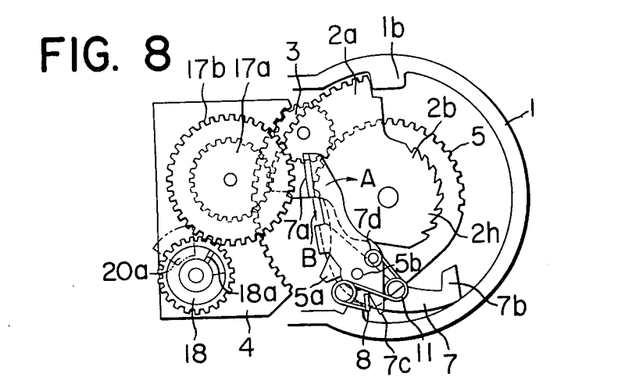
FIGS. 8 and 9 are respectively plan views showing a driving mechanism for a take-up spool in accordance with the embodiment of the present invention, in which FIG. 8 indicates a state immediately before taking-up of the film, and FIG. 9 indicates a state upon completion of the film winding.
Figure 9:
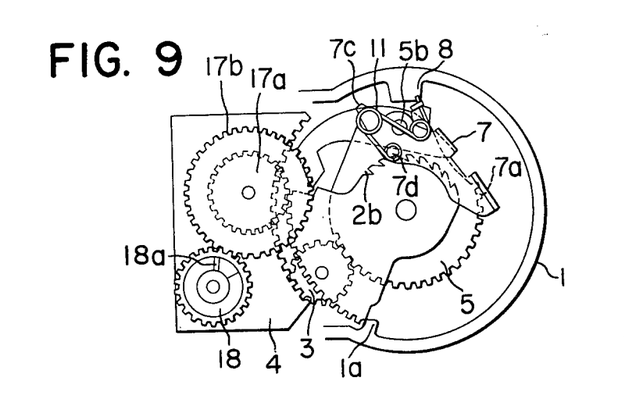

As most clearly shown in FIG. 5, an antireversing or reverse rotation prevention pawl 9 is rotatably held by the fixed pin 5b of the sun gear 5. The pawl 9 is energized by a spring 10 shown in FIG. 2 in the counterclockwise direction around the fixed pin 5b at each stage of: immediately before, during, and upon completion of the film winding as indicated in FIGS. 5, 6 and 7. Further, the pawl 9 possesses one end 9a to be engaged with the ratchet teeth 2b and the other end 9b to be in contact with the change-over lever 8. As shown in FIGS. 8 and 9, a change-over spring 11 is held at one end thereof in a groove 8a of the change-over lever 8, and is fitted at the other end thereon onto the pin 7d fixed on the spool actuating lever 7, the spring being so energized that both ends are made close each other.

Ratchet wheel 12 for the spool 13 as shown in FIG. 2 is rotatably held on the camera body 1. Between the ratchet wheel 12 and the film winding spool 13, there is provided a friction spring 14 to transmit rotation of the spool ratchet wheel 12 to the film winding spool 13. The ratchet pawl 7a of the spool actuating lever 7 is energized in the clockwise direction in accordance with the lever 7 which is put into action in that direction on the axis of the fixed pin 5b by the spring 11, and, when the spool actuating lever 7 is subjected to counterclockwise rotation around the film winding shaft 2h, the ratchet pawl 7a is engaged with teeth of the ratchet wheel 12 to cause it to rotate in that direction. As shown in FIG. 2, a friction plate spring 15 is disposed between the camera body 1 and the ratchet wheel 12 for the spool 13 to prevent the spool from its further rotation due to elasticity of the photographic film, when the ratchet pawl 7a of the spool actuating lever 7 disengages from the ratchet wheel 12.

As also shown in FIG. 2, a spring 16 for the film winding lever 2 is disposed in the camera body 1 surrounding the film winding shaft 2h, and energizes the winding lever 2 in the direction opposite the film winding direction, i.e., in the clockwise direction.

As shown in FIG. 3, of two intermediate gears 17a and 17b which are integrally formed, and rotatably and pivotally supported in the camera body 1, the gear 17a is engaged with the sector gear 2a, while the other gear 17b is engaged with a sprocket wheel 18 rotatably supported on a pivot on the internal gear 4 fixed in the camera body 1. Accordingly, rotational force of the sector gear 2a is transmitted to this sprocket wheel 18 through the intermediate gears 17a and 17b. Again, as shown in FIG. 2, a compression spring 19 is provided between the internal gear 4 and the sprocket wheel 18 to urge the latter in the upward direction.

As shown in FIGS. 2 and 3, a small projection 18a upwardly from the sprocket wheel 18 is shown to be engageable with a projection 20a extending downwardly from another sprocket 20 confronting the sprocket wheel 18, when the former is rotating in the film winding direction, i.e., in the counterclockwise direction in FIG. 3, so as to transmit its rotational force to the sprocket 20. However, the engagement structure between the projections 18a and 20a of the sprocket wheels 18 and 20 is so designed by a well known expedient that no rotational force of the sprocket wheel 18 is transmitted to the sprocket 20 when the former rotates in the opposite direction.

The sprocket 20, as shown in FIG. 2, is supported on a sprocket shaft 21 which, in turn, is rotatably held on a pivot provided in the camera body 1, and the sprocket is provided at one part thereof with a groove 20b, with which a projection 21a formed at one part of the shaft at a position corresponding to that of the groove 20b is engaged, whereby the rotational force of the sprocket 20 is transmitted to the sprocket shaft 21 through the engagement of the groove 20b and the projection 21a.

Another projection, or, bulged portion 21b formed on the upper part of the sprocket shaft 21 is engaged with a rotary coupling shaft 23 rotatably held on the camera body 1 to transmit the rotational force of the sprocket shaft 21 to the coupling shaft 23. A spring 22 provided in the space between the sprocket 20 and the sprocket shaft 21 energizes the sprocket shaft 21 in the upward direction so as to cause it to return to its original position at the time of rewinding the film, the sprocket shaft being usually pushed downwardly by a known expedient.

Figure 12:
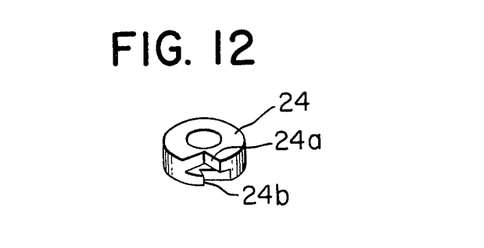
FIG. 12 is a perspective view showing a control cam to be used for the film winding device according to the present invention.

On the top part of the coupling shaft 23, there is provided a cam 24 for limiting rotation of the sprocket 20, which is fixed to the shaft 23 by means of screw means. The cam 24 as shown in FIG. 12 possesses two notched parts 24a and 24b on the periphery thereof.

The gear ratios (not necessarily to be an integer) among the sector gear 2a, the intermediate gears 17a and 17b, and the sprocket 18 are so determined that the number of revolutions of the sprocket wheel 18 required to transfer one film frame may be greater than that of the counterpart sprocket 20 (in this embodiment, it is one revolution).

Figure 10:
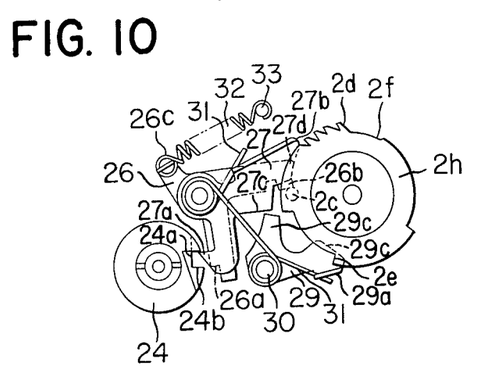
FIGS. 10 and 11 are respectively plan views showing a mechanism for stopping rotation of the sprocket in accordance with the embodiment of the present invention, in which FIG. 10 indicates a state immediately before commencement of the film winding, and FIG. 11 indicates a state upon completion of the film winding.
Figure 11:
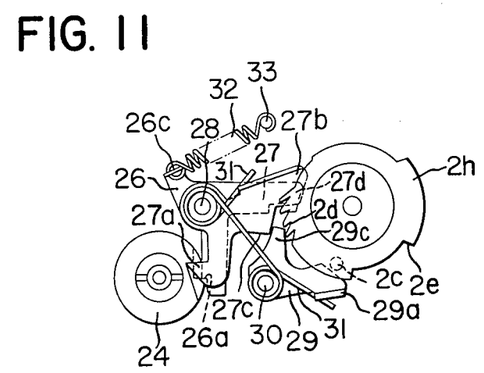

As shown in FIGS. 2, 10 and 11, on the upper part of the camera body 1 in the vicinity of the sprocket rotation limiting cam 24, there is provided a fixed shaft 28 secured onto the camera body. A lever 26 for limiting the sprocket rotation and another lever 27 for preventing incomplete shutter charging are rotatably supported on the fixed shaft 28. The limiting lever 26 is provided at one part thereof with a pawl, or more specifically a notch 26a, to be engaged with the notched part 24b of the sprocket rotation limiting cam 24 to prevent the cam from rotating counterclockwise; at another part thereof, with a riser part 26b to be engaged with the eccentric pin 2c on the winding shaft 2h; and, at other part thereof, with another riser part 26c.

A tension spring 32 is secured at one end thereof to the abovementioned riser part 26c, and, at the other end thereof, to a pin fixed on the camera body 1 so as to urge the limiting lever 26 in the clockwise direction, as shown in FIG. 10.

On the other hand, the incomplete shutter charging prevention lever 27 is provided at one part thereof with a pawl 27a to be engaged with the notched portion 24a of the sprocket rotation limiting cam 24 to prevent the cam from its clockwise direction; at another part thereof, with a pawl 27b to be engaged with the ratchet wheel 2d; at other part thereof, with an end part 27c to be engaged with a stopping part 29c of a shutter release lever 29; and, at still other part, with an engaging part 27d to be engaged with the riser part 26b of the limiting lever 26. The sprocket rotation limiting cam 24 is so constructed that it accomplishes one revolution during the winding of one film frame, and upon completion of the film winding, the notched parts 24a and 24b come to their respective positions where they are engaged with the pawls 27a and 26a of the two levers 27 and 26, respectively.

The shutter release lever 29 rotatably supported on a shaft 30 fixed on the top part of the camera body 1 is provided with a ratchet pawl 29a to be engaged with the sector type notch 2c formed on the film winding shaft 2h, a projection 29b to be in contact with the eccentric pin 2c on the film winding shaft, and the abovementioned stopping part 29c.

A torsion spring 31 which is turned round the fixed shafts 28 and 30 in succession serves to energize the incomplete shutter charging prevention lever 27 in the clockwise direction and the shutter release lever 29 in the counterclockwise direction.

Figure 13:
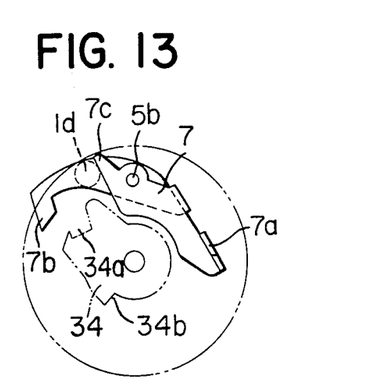
FIGS. 13 and 14 are respectively plan views showing a shutter releasing mechanism according to the embodiment of the present invention.
Figure 14:
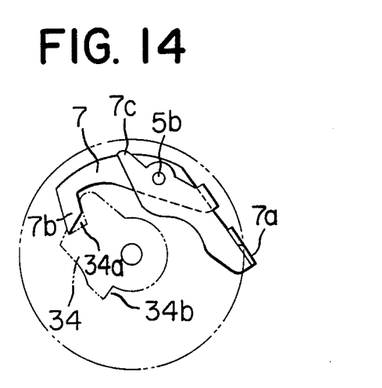

Referring now to FIGS. 2, 13 and 14, a shutter cam 34 is rotatably supported at the bottom of the camera body 1, and is so constructed that it may always be set at a predetermined position when the shutter is charged. This shutter cam 34 is provided with a notch or 34a to be engageable with a shutter release pawl 7b of the spool actuating lever 7, and another notch or projection 34b.

The film-winding, shutter-charging and shutter-releasing device of the afore-described construction according to the present invention will operate in the following fashion, and the details of such operations are explained in sequence of the operational stages.

1. Film Winding a. Rotating Operation of the Winding

Referring to FIGS. 2, 8 and 9, when the film winding lever 2 is turned against the force of the spring 16 so as to cause the film winding shaft 2h to rotate in the counterclockwise direction, the planet gear 3 provided on th sector gear 2a, which rotates counterclockwise, revolves around the film winding shaft 2h in the counterclockwise direction, while it is rotating in the clockwise direction, because the planet gear 3 is engaged with the fixed internal gear 4. Consequently, the sun gear 5 rotates counterclockwise with its number of revolutions being greater than that of the sector gear 2a. On the other hand, since the spool actuating lever 7 which revolves in unison with the sun gear 5 is energized by the change-over spring 11 in the clockwise direction around the fixed pin or shaft 5b on the sun gear 5, the ratchet pawl 7a for the spool 13 rotates in the direction shown by an arrow B, while being energized in the direction of an arrow A, as shown in FIG. 8, with the result that the ratchet pawl 7a becomes engaged with the ratchet wheel 12 for the spool 13 to cause the spool to rotate in the counterclockwise direction.

Further, since the number of revolutions of the sun gear 5 is greater than the number of revolutions of the sector gear 2a, the one end 9a of the reverse rotation prevention pawl 9 which has been separated from the ratchet teeth 2b before the film winding commences (vide FIG. 5) becomes engaged therewith upon commencement of the film winding (vide FIG. 6) with the result that, even when the film winding lever 2 is liberated from the manual operation on its way of winding, there is no possibility of the film winding lever 2 returning in the clockwise direction by the force of the spring 16. Upon further shifting of the lever 2, the film winding operation is complete (see FIG. 7), when the change-over lever 8 supported on the fixed pin 5b contacts a rotation limiting part 1b inwardly projecting from the inner wall of the camera body 1, and is subjected to further and compulsory rotation in the clockwise direction with the fixed pin 5b as its center. Consequently, the change-over lever 8 contacts the end part 9b of the reverse rotation prevention pawl 9 to cause the pawl to rotate clockwise with the fixed pin 5b as its center.

Thus, at the completion of the winding, the engagement between the reverse rotation prevention pawl 9 and the ratchet teeth 2b is released to bring the film winding shaft 2h to its state of rotation in the clockwise direction so as to return to its original position.

On the other hand, as shown in FIG. 9, when the change-over lever 8 rotates in the clockwise direction by its contact with the rotation limiting part 1b at the completion of the film winding, one end of the change-over spring 11 hooked on the spring hooking groove 8a of the change-over lever 8 is also moved compulsorily therealong in the clockwise direction. On account of this, the spool actuating lever 7, which has been energized to rotate in the clockwise direction during the film winding operation, becomes energized on the pivot of the fixed pin 5b in the counterclockwise direction upon passing through its dead point with the fixed pin 5b as the center thereof.

b. Sprocket Rotation Due to the Winding Operation

Referring now to FIGS. 8 and 9, the rotation of the sprocket due to the film winding operation will be explained.

The counterclockwise rotation of the sector gear 2a by the abovementioned winding operation is transmitted to the sprocket wheel 18 by way of the intermediate gears 17a and 17b, whereby the sprocket wheel 18 also rotates counterclockwise.

In the case where the gear ratio of the sprocket wheel 18 is so set that it is caused to rotate by 360° by a definite rotation of the film winding lever 2, and the sprocket 20 is also required to rotate by 360° for winding one film frame, and the engaging gears 2a, 17 and 18 are machined and assembled at so high a precision that the influence of the backlash on the gears from the film winding shaft 2h and the sprocket 20 is negligible, both sprocket wheel 18 and the sprocket 20 commence their rotations simultaneously with the commencement of rotation of the film winding lever 2. After rotation by 360°, the sprocket wheel 18 and the sprocket 20 stop their rotation simultaneously with stoppage of the film winding lever 2.

Also, in the case where the gear ratio of the sprocket wheel 18 is so set that it is caused to rotate by 360° by a definite rotation of the film winding lever 2, and the sprocket 20 is also required to rotate by 360° for winding one film frame, and the backlash of the engaging gears from the film winding shaft 2h to the sprocket wheel 18 is, for example, 7° in terms of the rotational angle, both sprocket wheel 18 and the sprocket 20 commence rotation at the same time by means of the gear 17 upon rotation of the film winding lever 2 by a certain angle after its commencement of rotation. However, owing to influence of the backlash from the film winding shaft 2h to the sprocket wheel 18, the sprocket wheel 18 rotates only 353° (i.e., 360° − 7° = 353°), hence the sprocket also rotates only 353°. In other words, the sprocket rotates less than 360° by 7°.

According to the embodiment of the present invention, the engaging part of the driving member is given a number of revolutions $A'$ until it is engaged with the engaging part of the sprocket in accordance with the following equations.

$$A = A' \quad (1)$$

$$L \text{ const.} = (S \text{ const.} + \theta + A) \times 1/G \text{ const.} \quad (2)$$

$$D = S \text{ const.} + A' \quad (3)$$

where: L const. denotes a definite number of revolutions of the film winding shaft 2h; S const. is a definite number of revolutions desired for the sprocket 20; $\theta$ is a reduced number of revolutions of the sprocket 20 due to the backlash of the gears (including the backlash caused by the distance between the gear centers) from the film winding shaft 2h to the driving member 18; A is the reduced number of revolutions of the abovementioned sprocket 20 caused by the distance between the engaging part of the driving member 18 and the engaging part of the sprocket 20; 1/G const. is the gear ratio of the driving member 18 with respect to the film winding shaft 2h; D is the number of revolutions of the driving member; and $A'$ is the number of revolutions of the abovementioned driving member 18 until the driving member which has commenced rotation becomes engaged with the engaging part of the sprocket 20.

That is to say, even if there exist backlash among the engaged gears from the film winding shaft 2h to the driving member 18 (the backlash includes that caused by errors in the distance between the gear centers), and even when the amount of the gear backlash differs from camera to camera, the driving member 18 and the sprocket 20 are disposed at a distance corresponding to the amount of A between the engaging faces of the driving member 18 and the sprocket 20, and the number of revolutions D of the driving member 18 is set greater than the number of revolutions of the sprocket 20 by A which is equal to $A'$. Accordingly, when the film winding lever 2h rotates by $\theta \times 1/G$ const., the driving member 18 commences rotation, and, when the film winding lever 2h rotates by $(\theta + A) \times 1/G$ const. and the driving member 18 by $A'$, the sprocket 20 commences rotation. On the other hand, when the sprocket 20 rotates by S const., the driving member 18 by S const. + $A'$, and the film winding lever 2 by (S const. + $\theta$ + A) × 1/G const each of these rotating members ceases its rotation.

Further, from the foregoing equations (1) and (2), $(\theta + A')$ can be rewritten as in the following equation (4).

$$\theta + A' = G \text{ const.} \times L \text{ const.} - S \text{ const.} \quad (4)$$

Therefore, the distance $A'$ between the engaging faces is so set as to satisfy the above equation (4) in accordance with the degree of the backlash $\theta$ for each camera. For instance, when the following parameters are given:

L const. = 76°,
S const. = 360°,
1/G const. = 1/5,
$\theta = 7°$, an equation (5) is derived from the equation (4), as follows:

$$7° + A' = 5 \times 76° - 360° \quad (5)$$

Hence, $A' = 13°$. On the other hand, if $\theta = 6°$, an equation (6) is similarly derived from the equation (4), as follows:

$$6° + A' = 5 \times 76° - 360° \quad (6)$$

Hence, $A' = 14°$.

From the foregoing mathematic calculations, it is concluded that the rotational angle for the rotary driving member 18 to become engaged with the engaging part of the sprocket 20 will be 13° and 14° respectively. In this case, by taking the angle between the engaging faces as 13° and 14°, the film winding lever 2 can rotate by 76°, while the sprocket 20 becomes rotatable by 360°.

c. Stopping Operation of the Rotating Sprocket at the Completion of the Film Winding Referring to FIGS. 1, 2, 10 and 11, in particular, the functions of the sprocket rotation and stoppage at the completion of the film winding will be described hereinbelow.

With rotation of the sprocket 20, the sprocket shaft 21 also rotates on account of the engagement between the groove 20b of the sprocket 20 and the projection 21a of the sprocket shaft 21 as shown in FIG. 2. Simultaneously, the rotary coupling shaft 23 engaged with another projection 21b of the sprocket shaft 21 is rotated in accordance with rotation of the sprocket shaft 21, whereby the sprocket rotation limiting cam 24 secured on the top part of the rotary coupling shaft 23 also rotates in the counterclockwise direction as may be understood from FIG. 10 which indicates a state of each component member immediately before the film winding. On the other hand, the pawl 27b of the incomplete shutter charging prevention lever 27 is out of the rotational orbit of the ratchet teeth 2d in spite of the energizing force of the spring 31 in the clockwise direction, because the end part 27c is engaged with the stopper 29c of the shutter release lever 29. On account of this structure, the film winding shaft 2h possibly rotates in the counterclockwise direction. The other pawl 27a of the incomplete shutter charging prevention lever 27 is engaged with the notched part 24a of the sprocket rotation limiting cam 24. The pawl, or more specifically, notch 26a of the sprocket rotation limiting lever 26 acts to prevent the sprocket rotation limiting cam 24 from its counterclockwise rotation i.e., rotation in the film winding direction by the engagement of the pawl 26 and the notched part 24b of the sprocket rotation limiting cam 24 is released from the engagement with the notched part 24b by the engagement between the riser part 26b and the eccentric pin 2c provided on the film winding shaft 2h. As the result, the sprocket rotation limiting cam 24 freely rotates in the film winding, or counter-clockwise direction.

When the film winding shaft 2h rotates counterclockwise by the film winding operation of the winding lever 2, the engagement between the riser part 26b of the sprocket rotation limiting lever 26 and the eccentric pin 2c is released, and the lever 26 tends to rotate in the clockwise direction. However, as previously indicated in the preceding, since the sprocket rotation limiting cam 24 has already rotated in the counterclockwise direction at that time by the film winding operation, the pawl 26a does not fall into the notched part 24b, but contacts the outer peripheral part of the cam 24, whereby the sprocket rotation limiting lever 26 is restrained from its further rotation. On the other hand, immediately after the film winding shaft 2h commences rotation in the counterclockwise direction, the ratchet pawl 29a of the shutter release lever 29 becomes engaged with the sector type notch 2e formed on the film winding shaft 2h, on account of which no reverse rotation of the film winding lever 2 becomes possible thereafter. This engagement between the ratchet pawl 29a and the sector notch 2e takes place in advance of the engagement between the reverse rotation prevention pawl 9 and the ratchet teeth 2b as already explained in reference to FIG. 6. Accordingly, even when the ratchet pawl 29a is disengaged from the notch 2e by the rotation of the film winding shaft 2h thereafter, the reverse rotation of the film winding lever 2 in the clockwise direction is also impossible on the way of the film winding operation, because the reverse rotation prevention pawl 9 is then engaged with the ratchet teeth as explained in reference to FIG. 6.

When the film winding shaft 2h further rotates in the counter-clockwise direction by the operation of the film winding lever 2, and the eccentric pin 2c provided on the shaft 2c contacts the projection 29b of the shutter release lever 29, the lever 29 is caused to rotate in the clockwise direction against the energizing force of the spring 31. Then, the stopping part 29c of the shutter release lever 29 disengages from the end part 27c of the incomplete shutter charging prevention lever 27 with the consequence that the lever 27 becomes rotatable in the clockwise direction by the force of the spring 31. Thereafter, when the notched part 24a of the sprocket rotation limiting cam 24 comes to a position confronting the pawls 26a and 27a of the sprocket rotation limiting lever 26 and the incomplete shutter charging prevention lever 27, respectively, the pawls 26a and 27a fall into the notches 24a and 24b of the sprocket rotation prevention cam 24, respectively, by the energizing force of the respective springs 32 and 31 to accomplish the film winding. At this time, the pawl 27b is engaged with the ratchet teeth 2d formed on the outer peripheral part of the film winding shaft 2h so as to prevent the shaft 2h from its counterclockwise rotation thereafter. After this engagement, the pawl 27a is engaged with the notch 24a, and the pawl 26a with the notch 24b, whereby rotations of the sprocket 20 in both clockwise and anti-clockwise directions becomes impossible.

It will be apparent that the rotation of the film winding spool, the rotation of the sprocket, and the restrained rotation of the sprocket by the operation of the film winding lever 2 are all carried out in parallel until the film winding operation becomes complete, at which time the film winding lever 2 is at the position II in FIG. 1. On the other hand, the reverse rotation prevention pawl 9 is disengaged from the ratchet teeth 26 as previously indicated (see FIG. 7), and the film winding lever 2 tends to go back in the clockwise direction by the spring 16 for the film winding lever 2. However, as previously explained with reference to FIG. 9, as the spool actuating lever 7 is energized in the counterclockwise direction around the fixed pin 5b on the sun gear 5 by means of the change-over spring 11, the spool actuating lever 7 rotates in the counterclockwise direction on the axis of the fixed pin 5b by the force of the spring 11, while it is revolving around the film winding shaft 2h in the clockwise direction as shown in FIG. 13, which indicates the positional relationship between the spool actuating lever 7 and the shutter cam 34 at the completion of the film winding. Consequently, the releasing pawl 7b falls into the groove 34a of the shutter cam 34 (see FIG. 14) to prevent the spool actuating lever 7 from rotating, whereby the film winding lever 2 also stops its return motion. At this return motion of the film winding lever 2, the small upward projection 18a of the sprocket wheel 18 also returns slightly toward the clockwise direction and stops the projection 18a being engaged through the intermediate gears 17 and 17b. In addition, the counterclockwise rotation of the spool actuating lever 7 causes disengagement of the ratchet pawl 7a from the ratchet wheel 12, when the film winding lever 2 is at the position III in FIG. 1.

2. Shutter Releasing Operations

In FIG. 14 which shows the positional relationship between the shutter cam 34 and the spool actuating lever 7 while the film winding lever 2 is at the position III in FIG. 1, when the lever 2 which has stopped by the engagement of the releasing pawl 7b and the groove 34a is caused to rotate again in the counterclockwise direction, the spool actuating lever 7 also commences revolution in the counterclockwise direction, and the shutter cam 34 also rotates in the counterclockwise direction by the engagement of the releasing pawl 7b and the groove 34a. Also, when the release control part 7c of the spool actuating lever 7 hits the fixed pin 1d provided on the bottom part of the camera body 1, the spool actuating lever 7 rotate the clockwise on the axis of the fixed pin 5b on the sun gear 5, whereby the releasing pawl 7b disengages from the groove 34a. At this time, the shutter cam 34 rotates in the counterclockwise direction by an expedient (not shown) to release the shutter, and the notch 34b of this shutter cam 34 is engaged with a fixed pin (not shown) on the sun gear 5 for stoppage of the cam 34. The position of the film winding lever 2 in this case is at "II" in FIG. 1.

3. Shutter Charging Operations

After the shutter release, when the film winding lever 2 is made free from an operator's hand, the lever 2 rotates in the clockwise direction together with the film winding shaft 2h by the force of the spring 16, since the groove 34a of the shutter cam 34 has already shifted in the counterclockwise direction at the time of shutter release, and the spool actuating lever 7 is therefore free from engagement with any component member whatsoever. Accordingly, the sun gear 5 rotates in the clockwise direction, and the shutter cam 34 also rotates clockwise by the engagement of the notch 34b of the shutter cam 34 with the fixed pin (not shown) on the abovementioned sun gear 5, whereby the cam 34 returns to its position shown in FIG. 13 at the end of the shutter charging operation. By the clockwise rotation of the shutter cam 34, the shutter is charged through a known means (not shown). On the other hand, in the course of the clockwise rotation of the film winding lever 2 for the shutter charging, no counterclockwise rotation of the film winding lever 2 can be performed on account of the ratchet pawl 27b of the incomplete shutter charging prevention lever 27 being engaged with the ratchet teeth 2d. As a result, that the film winding lever 2 returns to the position I from the position II as shown in FIG. 1, and the shutter is always brought to its charged state before the film winding is carried out. In connection with this, the eccentric pin 2c reinstates from its position as shown in FIG. 11 to that as shown in FIG. 10 while the film winding lever 2 returns to its position I in FIG. 1 for charging the shutter. However, since the eccentric pin 2c pushes the riser part 26b of the sprocket rotation limiting lever 26 as shown in FIG. 10, the film winding lever 2 rotates in the counterclockwise direction, and, at the same time, the incomplete shutter charging prevention lever 27 also rotates in the counterclockwise direction by the engagement between the engaging part 27d of the lever 27 and the riser part 26b of the lever 26. As the result, the pawl 26a of the sprocket rotation limiting lever 26 separates from the notched part 24b of the sprocket rotation limiting cam 24, whereby the counterclockwise rotation of the cam 24 becomes possible. The end part 27c of the incomplete shutter charging prevention lever 27, on the other hand, becomes engaged with the stopping part 29c of the shutter release lever 29 to disengage the pawl 27b from the ratchet teeth 2d, whereby the film winding shaft 2h becomes rotatable in the winding direction. At this time, as the pawl 27a of the incomplete shutter charging prevention lever 27 has not yet been separated from the notched part 24a of the sprocket rotation limiting cam 24, the clockwise rotation of the sprocket 20 is not possible, thereby preventing the film from becoming unexpectedly rewound.

At the time of re-winding of the film, the sprocket shaft 21 is pushed downward by a known method as in FIG. 2 to disengage the projection 21b from the rotary coupling shaft 23 and to simultaneously push down the sprocket wheel 18 against the force of the spring 19. By this operation, the engagement between the downward projection 20a of the sprocket 20 and the small upward projection 18a of the sprocket wheel 18 is released, and the sprocket 20 is thereby brought to its rotatable state, hence the re-winding of the film becomes possible.

As has been explained in the foregoing, the present invention sets the number of revolutions A' of the driving member of the sprocket wheel 18 in accordance with the equations (1), (2), and (3); however, the reduced number of $\theta$ of the sprocket 20 may be due to the backlash of the gears in each camera. Consequently, in spite of existence of the gear backlash and in spite of the different amount of the gear backlash in each camera, no influence is imparted to the film winding operation, and the required precise winding can always be carried out, with the result that high precision is not required in machining and assembling of the gears. Needless to say, the number of revolutions L of the film winding shaft 2h and the number of revolution S of the sprocket 20 in this case may be arbitrary.

Further, in the afore-described device, there takes place no inconvenience such that the small upward projection 18a of the sprocket wheel 18 moves under the engaging part 20a of the sprocket 20 owing to reduction in the number of revolutions of the sprocket wheel 18 affected by the gear backlash at the time of the reverse rotation of the film winding lever (from the position II to the position I in FIG. 1). In addition, by providing the abovementioned sprocket rotation limiting cam 24 and the sprocket rotation limiting lever 26, any increase in the number of revolutions of the sprocket 20 due to inertia of every gear can be prevented. That is to say, a definite amount of film can be wound up with certainty, even when the film winding lever is abruptly operated.

While the present invention has been illustrated and fully described by way of a preferred embodiment thereof, it is to be understood that such are merely illustrative and not restrictive, and that variations and modifications may be made therein without departing from the spirit and scope of the present invention as set forth in the appended claims.

I claim:

1. A film winding device for photographic cameras, which comprises:
   a. a film winding shaft having a gear;
   b. a rotary driving member driven by the film winding shaft, and having a gear and an engaging part thereon;
   c. a fixed gear to transmit rotational force of said film winding shaft to the rotary driving member; and d. a sprocket having an engaging member to be engaged with the engaging part of said driving member during winding operation to receive the rotational force of said rotary driving member, the improvement resides in that the engaging part of said rotary driving member being provided with a rotational angle, until the engaging part becomes engaged with the engaging member of said sprocket, in accordance with the following equations:

$$A = A' \text{ L const.} = (S \text{ const.} + \theta + A) \times 1/G \text{ const. D}$$
$$= S \text{ const.} + A'$$

where: L is a definite number of revolution of said film winding shaft; S is a definite number of revolution desired of said sprocket; $\theta$ is a reduced number of revolution of said sprocket due to the backlashes among the plurality of gears assembled between said film winding shaft and said driving member; A is a reduced number of revolution of said sprocket due to the distance between the engaging part of said driving member and the engaging part of said sprocket; l/G const. is a gear ratio of said rotary driving member to said film winding shaft; D is a number of revolution of said driving member; and A' is a number of revolution of said rotary driving member, until the driving member becomes engaged with the engaging part of said sprocket.

2. The device as claimed in claim 1, wherein the device further comprises: a sprocket rotation limiting member to move in unity with said sprocket, and an interconnection with the film winding operation; and a stopper member which is interconnected with the film winding operation to be engaged with said sprocket rotation limiting member at the completion of the winding of one film frame so as to cause said limiting member to stop further rotation of the sprocket.

3. The device as claimed in claim 1, further comprising a sprocket shaft capable of being engaged with said sprocket, of transmitting rotational force of said sprocket to said sprocket rotation limiting member, and of releasing the engagement between said sprocket rotation limiting member and said sprocket, as well as between said rotary driving member and said sprocket.

4. The device as claimed in claim 3, wherein a spring is provided between said sprocket and said sprocket shaft, and between said rotary driving member and said fixed gear.

5. In a film winding controller device for photographic cameras having a film winding shaft rotatable with a film winding lever to effect ordinary rotation of the winding lever capable of reciprocating movement for operating a film transport mechanism, the improvement comprising:

a. a limiting member rotatable with the film transport mechanism;
b. a stopper member pivotally mounted on the camera body, the stopper member being engageable with said limiting member at the limit of rotation of the limiting member upon ordinary rotation of the winding lever, the stopper member having first and second means, the first means stopping the movement of the limiting member and the second means engaging means provided on the film winding shaft;
c. spring means to urge the limiting member into engagement with said first means of the stopper member; and
d. a releasing member rotatable with the winding shaft, the releasing member actuating said second means of the stopper member against the action of said spring means to release the engagement between the limiting member and the stopper member upon restoration of the winding lever.

6. A device according to claim 5, wherein the limiting member is provided with a notched part for controlling the winding, said part being engaged with said first means of the stopper member.

7. A device according to claim 6, wherein said first means of the stopper member is engaged with the periphery of said limiting member by the force of said spring means upon ordinary rotation of the winding lever, and the limiting member effects one revolution at the time of ordinary rotation of the winding lever to wind up a single frame of film with said notched part opposed to said first means of the stopper member.

8. A device according to claim 5, wherein said second means of the stopper member is actuated by said releasing member at the limit of rotation of the winding shaft.

9. A device according to claim 5, wherein the film transport mechanism is a sprocket, and is further provided with means for preventing said sprocket from reverse rotation.

10. A device according to claim 9, wherein the means for preventing reverse rotation of the sprocket comprises:

a. a notch on the limiting member;
b. a reverse rotation preventing member having a pawl for preventing reverse rotation of the limiting member upon entry of the pawl in the notch, the member being pivotally mounted on the camera body; and
c. spring means for urging the pawl into the notch at the terminal of rotation of the winding shaft.

11. A device according to claim 5, wherein the releasing member is a pin on the winding shaft.

* * * * *